(12) United States Patent
Zhang et al.

(10) Patent No.: US 12,099,287 B2
(45) Date of Patent: Sep. 24, 2024

(54) TRANSPARENT PROJECTION SCREEN, AND MANUFACTURING METHOD FOR SAME

(71) Applicant: APPOTRONICS CORPORATION LIMITED, Guangdong (CN)

(72) Inventors: Hongxiu Zhang, Shenzhen (CN); Zhiyi Lu, Shenzhen (CN); Lin Wang, Shenzhen (CN); Yi Li, Shenzhen (CN)

(73) Assignee: APPOTRONICS CORPORATION LIMITED, Guangdong (CN)

( * ) Notice: Subject to any disclaimer, the term of this patent is extended or adjusted under 35 U.S.C. 154(b) by 120 days.

(21) Appl. No.: 17/891,489

(22) Filed: Aug. 19, 2022

(65) Prior Publication Data

US 2022/0390823 A1 Dec. 8, 2022

Related U.S. Application Data

(63) Continuation of application No. PCT/CN2020/142124, filed on Dec. 31, 2020.

(30) Foreign Application Priority Data

Feb. 28, 2020 (CN) .......................... 202010131577.1

(51) Int. Cl.
*G03B 21/62* (2014.01)
*G03B 21/56* (2006.01)
(Continued)

(52) U.S. Cl.
CPC .............. *G03B 21/62* (2013.01); *G03B 21/56* (2013.01); *G03B 21/58* (2013.01); *G03B 21/60* (2013.01); *G03B 21/625* (2013.01)

(58) Field of Classification Search
CPC ........ G03B 21/62; G03B 21/56; G03B 21/60; G03B 21/58; G03B 21/625
(Continued)

(56) References Cited

U.S. PATENT DOCUMENTS 9,030,736 B2 * 5/2015 Sadahiro .............. G03B 21/602
 359/449
10,197,905 B2 * 2/2019 Kim ..................... G03B 21/602
(Continued)

FOREIGN PATENT DOCUMENTS

CN 104298063 A * 1/2015 ............. G03B 21/60
CN 104777708 7/2015
(Continued)

OTHER PUBLICATIONS

International Search Report issued in corresponding International Application PCT/CN2020/142124, mailed Feb. 25, 2021.

*Primary Examiner* — Stephanie E Bloss
*Assistant Examiner* — Kevin C Butler
(74) *Attorney, Agent, or Firm* — Burris Law, PLLC

(57) ABSTRACT

A transparent projection screen and a manufacturing method. The transparent projection screen is for receiving projection light and transmitting ambient light and comprises a first substrate layer, a Fresnel structure layer, a surface diffusion layer, a nano metal plating layer, and a binding adhesive layer. The Fresnel structure layer is disposed on the first substrate layer and comprises a prism surface. The surface diffusion layer is disposed on a portion of the prism surface. The nano metal plating layer is disposed on the surface diffusion layer. The binding adhesive layer is disposed on the nano metal plating layer and fills and levels the prism surface. The projection light passes the first substrate layer and is incident on the prism surface and then reflected thereby. The ambient light passes the binding adhesive layer, the nano metal plating layer, the surface diffusion layer and the first substrate layer, and is emitted.

11 Claims, 8 Drawing Sheets

(51) Int. Cl.
*G03B 21/58* (2014.01)
*G03B 21/60* (2014.01)
*G03B 21/625* (2014.01)

(58) Field of Classification Search
USPC .......................................................... 359/443
See application file for complete search history.

(56) References Cited

U.S. PATENT DOCUMENTS

| | | | | |
|---|---|---|---|---|
| 2005/0141086 A1* | 6/2005 | Maruta | ................... | G03B 21/60 |
| | | | | 359/452 |
| 2005/0141091 A1* | 6/2005 | Maruta | ................... | G03B 21/60 |
| | | | | 359/493.01 |
| 2014/0092471 A1* | 4/2014 | Sadahiro | ................ | G03B 21/60 |
| | | | | 359/449 |
| 2015/0370156 A1* | 12/2015 | Kim | ......................... | G02B 1/14 |
| | | | | 359/458 |
| 2017/0242329 A1* | 8/2017 | Chien | ................... | G02B 5/1885 |
| 2022/0390823 A1* | 12/2022 | Zhang | .................... | G03B 21/62 |

FOREIGN PATENT DOCUMENTS

| | | | | | |
|---|---|---|---|---|---|
| CN | 105204283 | | 12/2015 | | |
| CN | 105204283 A | * | 12/2015 | | |
| CN | 107102509 | | 8/2017 | | |
| CN | 107102509 A | * | 8/2017 | .......... | G02B 5/0284 |
| CN | 108153102 | | 6/2018 | | |
| CN | 108153102 A | * | 6/2018 | .......... | G02B 3/0056 |
| CN | 110297387 | | 10/2019 | | |
| CN | 110297387 A | * | 10/2019 | | |
| CN | 112180672 A | * | 1/2021 | ......... | G02B 27/0101 |
| CN | 112859505 A | * | 5/2021 | ............. | G03B 21/60 |
| CN | 113325660 A | * | 8/2021 | ............. | G03B 21/60 |
| CN | 110244508 B | * | 12/2021 | ............. | G02B 5/003 |
| CN | 114509910 A | * | 5/2022 | | |
| JP | 2004341407 | | 12/2004 | | |
| JP | 2004341407 A | * | 12/2004 | | |
| JP | 2005208557 A | * | 8/2005 | ............. | G03B 21/60 |
| WO | WO-2019179124 A1 | | 9/2019 | | |
| WO | WO-2021169597 A1 | * | 9/2021 | ............. | G03B 21/60 |

* cited by examiner

TRANSPARENT PROJECTION SCREEN, AND MANUFACTURING METHOD FOR SAME

CROSS-REFERENCE TO RELATED APPLICATIONS

This application is a continuation of International Application No. PCT/CN2020/142124, filed on Dec. 31, 2020, which claims priority to and the benefit of Chinese Application No. 202010131577.1 filed on Feb. 28, 2020. The disclosures of the above applications are incorporated herein by reference.

FIELD

The present disclosure relates to the technical field of projection screens, and in particular, to a transparent projection screen and a manufacturing method for the transparent projection screen.

BACKGROUND

The statements in this section merely provide background information related to the present disclosure and may not constitute prior art.

A transparent projection screen can display a clear image on a transparent screen, and an observer can observe a background behind the screen through the screen, so that image information can be fused with background information to provide richer information interaction for the observer. A picture size of an existing projection screen is determined by a distance between a projection device and the projection screen. The larger the distance is, the larger the projection screen will be. An ultra-short-throw projection screen can perform projection at a short distance, which greatly saves space and increases occasions in which projection can be applied. Therefore, how to combine ultra-short-throw projection with transparent display technology to manufacture a transparent projection screen applicable to ultra-short-throw, and how to combine the advantages of the two to bring a better transparent display effect have been an unremitting pursuit in the technical field of projection display.

SUMMARY

This section provides a general summary of the disclosure and is not a comprehensive disclosure of its full scope or all of its features.

An objective of the present disclosure is to provide a transparent projection screen and a manufacturing method for same.

Embodiments of the present disclosure achieve the above objective through the following technical solutions.

In a first aspect, the present disclosure provides a transparent projection screen configured to receive projection light and transmit ambient light, including a first substrate layer, a Fresnel structure layer, a surface diffusion layer, a nano metal plating layer, a binding adhesive layer. The Fresnel structure layer is provided at the first substrate layer, and the Fresnel structure layer includes a prism surface. The surface diffusion layer is provided at at least a portion of the prism surface. The nano metal plating layer is provided at the surface diffusion layer. The binding adhesive layer is provided at the nano metal plating layer. The binding adhesive layer fills and levels the prism surface; a refractive index of the Fresnel structure layer is the same as a refractive index of the binding adhesive layer; the projection light passes through the first substrate layer and is incident on the prism surface and then reflected by the prism surface; and the ambient light sequentially passes through the binding adhesive layer, the nano metal plating layer, the surface diffusion layer, and the first substrate layer, and then is outputted.

In a second aspect, the present disclosure provides a manufacturing method for a transparent projection screen, including: providing a first substrate layer; providing a Fresnel structure layer at the first substrate layer, the Fresnel structure layer including a prism surface; providing a surface diffusion layer at at least a portion of the prism surface; providing a nano metal plating layer at the surface diffusion layer; and providing a binding adhesive layer at the nano metal plating layer, the binding adhesive layer filling and leveling the prism surface, and a refractive index of the Fresnel structure layer being the same as a refractive index of the binding adhesive layer.

Compared with the related art, in the transparent projection screen and the manufacturing method for same according to the present disclosure, the surface diffusion layer and the nano metal plating layer are sequentially provided at the prism surface of the Fresnel structure layer, so that the prism surface has great light scattering capability, which can improve a viewing angle of the screen and ensure clarity of a projected image while realizing ultra-short-throw projection. In addition, the binding adhesive layer having a same refractive index as the Fresnel structure layer fills and levels the prism surface, which can reduce an influence on the propagation direction and phase of the ambient light therethrough, so that most of the ambient light can reach an observer's eye through the screen, thereby improving the transparency of the transparent projection screen.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
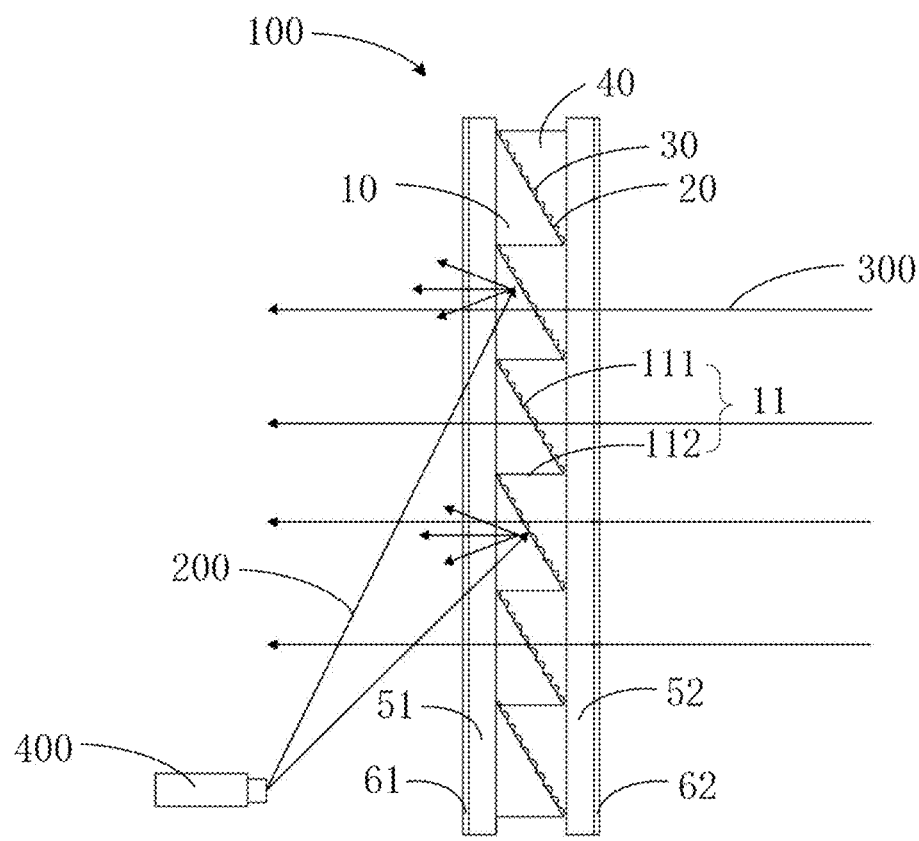
FIG. 1 is a schematic structural diagram of a transparent projection screen according to an embodiment of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

To facilitate illustrating embodiments of the present disclosure, a detailed description of the embodiments of the present disclosure will be given below with reference to the relevant accompanying drawings. Preferred embodiments of the present disclosure are given in the drawings. However, the present disclosure may be implemented in many different forms and is not limited to the embodiments described herein. Rather, these embodiments are provided herein to make the contents disclosed in the present disclosure more understandable.

Unless defined otherwise, all technical and scientific terms used herein have the same meanings as would generally understood by those skilled in the technical field of the present disclosure. The terms used herein in the embodiments of the present disclosure are for the purpose of describing specific embodiments only, and are not intended to limit the present disclosure.

In the existing transparent projection screen, a picture size is determined by a distance between the projection device and the projection screen, and a projected picture can be enlarged only by increasing the distance, which leads to a limitation on the scenarios in which the transparent projection screen can be applied. The ultra-short-throw projection screen can perform projection at a short distance, thereby greatly reducing a distance between the projection device and the projection screen and thus increasing the occasions in which projection can be applied. Therefore, based on the ultra-short-throw projection in combination with the transparent display technology, an embodiment of the present disclosure provides a transparent projection screen applicable to ultra-short-throw, which can achieve clear image projection while maintaining a transparent state of the screen, has a certain gain and field of view, and can be applied to home display screens, space design, exhibition display, window display and other aspects.

Figure 2:
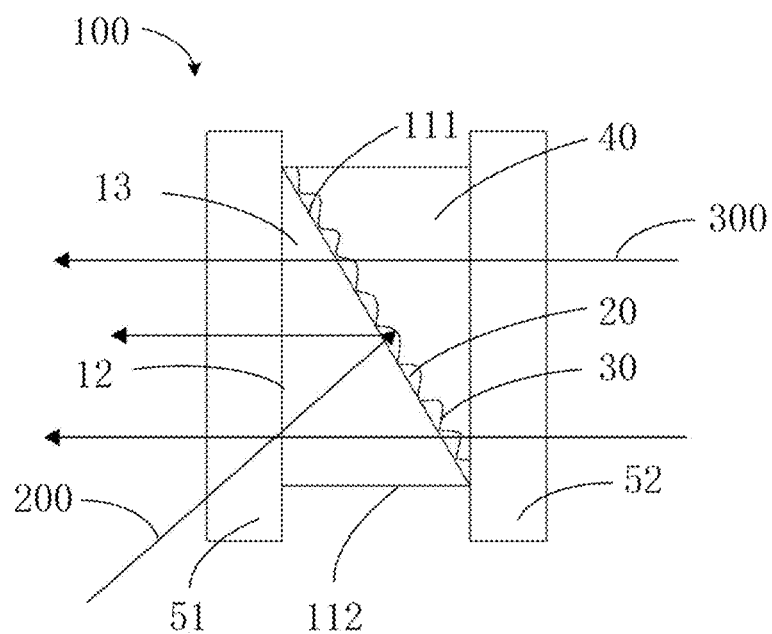
FIG. 2 is a schematic diagram of a microstructure of the transparent projection screen according to an embodiment of the present disclosure.

Referring to FIG. 1 and FIG. 2, an embodiment of the present disclosure provides a transparent display screen 100 configured to receive projection light 200 and transmit ambient light 300. The transparent display screen 100 includes a first substrate layer 51, a Fresnel structure layer 10, a surface diffusion layer 20, a nano metal plating layer 30, and a binding adhesive layer 40.

The Fresnel structure layer 10 is disposed at the first substrate layer 51, and the Fresnel structure layer 10 includes a prism surface 11. The surface diffusion layer 20 is disposed at at least a portion of the prism surface 11. The nano metal plating layer 30 is disposed at the surface diffusion layer 20. The binding adhesive layer 40 is disposed at the nano metal plating layer 30, and fills and levels the prism surface 11, and the binding adhesive layer 40 has a same refractive index as the nano metal plating layer 30. The projection light 200 passes through the first substrate layer 51 and is incident on the prism surface 11 and then reflected by the prism surface 11. The ambient light 300 sequentially passes through the binding adhesive layer 40, the nano metal plating layer 30, the surface diffusion layer 40, and the first substrate layer 51, and is outputted.

The projection light 200 may be generated by a projector 400, the surface diffusion layer 20 can scatter the projection light 200, and the nano metal plating layer 30 can reflect the projection light 200 and transmit the ambient light 300 at the same time, so that the prism surface 11 has a great light scattering capability. As a result, a projected image with a certain gain and field of view can still be achieved to ensure clarity of the projected image even if the projector 400 casts the projection light 200 over a short distance. At the same time, the binding adhesive layer 40, which has a same refractive index as the Fresnel structure layer 10, fills and levels the prism surface 11, and a flat surface is formed at a side of the transparent projection screen 100 facing away from the first substrate layer 51, thereby reducing an influence on the propagation direction and phase of the ambient light 300 when the ambient light passes through the screen, so that most of the ambient light 300 can reach the observer's eyes through the screen, bringing a better transparent display effect.

It is to be noted that a metal plating layer with a normal thickness is opaque, but when the metal layer is nanometer thick, the metal layer can reflect some of the light and absorb some of the light, and the rest of the light can pass through the metal layer to form transmitted light.

In an embodiment of the present disclosure, the Fresnel structure layer 10 includes a plurality of microprism units 13. A plurality of microprism units 13 with equal distances from the center form an arc, and a plurality of microprism units 13 with unequal distances from the center form a plurality of concentric arcs (see FIG. 6 for details). Each microprism unit 13 includes a first prism surface 111, a second prism surface 112, and a side surface 12. A longitudinal section of the microprism unit 13, that is, a section perpendicular to a wall or a mounting plane, may be a right triangle. The first prism surface 111 corresponds to a hypotenuse of the right triangle, and the second prism surface 112 and the side surface 12 correspond to two right-angle sides of the right triangle, respectively. During usage, the side surface 12 is roughly perpendicular to a ground plane, and the second prism surface 112 is located at a lower side of the side surface 12 and is parallel to the ground plane. An angle formed between the first prism surface 111 and the side surface 12 is an acute angle.

In some embodiments, the prism surface 11 includes a first prism surface 111 and a second prism surface 112, the surface diffusion layer 20 and the nano metal plating layer 30 are sequentially disposed at the first prism surface 111, part of the projection light 100 passes through the side surface 12 and is incident on the first prism surface 111 and then reflected by the first prism surface 111, part of the projection light 100 passes through the second prism surface 112 and is incident on the prism surface 11 and then reflected by the prism surface 11, and the ambient light 300 sequentially passes through the first prism surface 111 and the side surface 12 and is then outputted.

It is to be noted that an inclination angle of the first prism surface 111, that is, the angle formed between the first prism surface 111 and the side surface 12, may be calculated according to an orientation relationship between the projector 400 and the transparent projection screen 100 and a region where a viewer is located, so as to ensure that the viewer can obtain the best viewing experience. A specific calculation process thereof may be obtained with reference to the existing projection display technology, which is not specifically described/limited in this embodiment.

In an embodiment of the present disclosure, a refractive index of the Fresnel structure layer 10 is the same as that of the binding adhesive layer 40, and the Fresnel structure layer 10 and the binding adhesive layer 40 may be made by transparent organic materials with a same refractive index, such as Polyethylene terephthalate (PET) and polymethyl methacrylate (PMMA).

In an embodiment of the present disclosure, the first substrate layer 51 is disposed at the side surface 12, and visible light transmittance of the first substrate layer 51 is greater than 90%. In an example, the first substrate layer 51 may be made by a transparent organic material such as PET or PMMA. The first substrate layer 51 is used as a substrate structure, which can ensure a transparent display effect of the transparent projection screen 100 due to its higher visible light transmittance.

Figure 3:
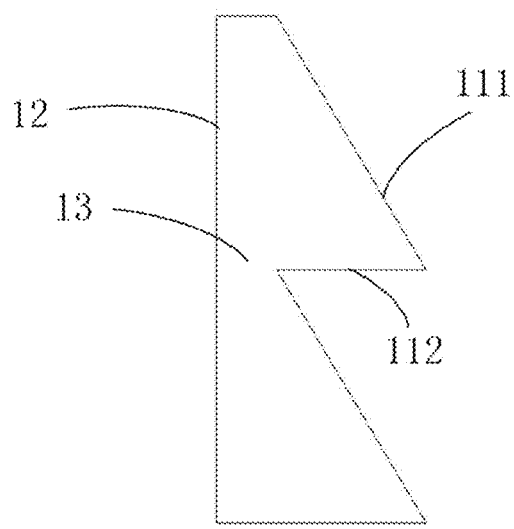
FIG. 3 is a schematic structural diagram of a Fresnel structure layer in the transparent projection screen according to an embodiment of the present disclosure.

In some embodiments, the longitudinal section of the microprism unit 13 may be roughly a right trapezoid (see FIG. 3 for details), the side surface 12 corresponds to a right-angle side of the right trapezoid, the first prism surface 111 corresponds to a hypotenuse of the right trapezoid, and the second prism surface 112 corresponds to a lower base of the right trapezoid. In this embodiment, there is no need to provide an additional substrate structure on the Fresnel structure layer 10, and those skilled in the art can selectively provide the first substrate layer 51 on the Fresnel structure layer 10 as required.

In this embodiment, the transparent projection screen 100 further includes a second substrate layer 52. The second substrate layer 52 is disposed at a side of the binding adhesive layer 40 facing away from the Fresnel structure layer 10, and visible light transmittance of the second substrate layer 52 is greater than 90%. In an example, the second substrate layer 52 may be made by a transparent organic material such as PET or PMMA. The second substrate layer 52 is used as a substrate structure, which can ensure a transparent display effect of the transparent projection screen 100 due to its higher visible light transmittance.

It is to be noted that a longitudinal section of the binding adhesive layer 40 corresponding to part of each microprism unit 13 may be a regular graphic such as a right triangle or a right trapezoid. When a cross section of the binding adhesive layer 40 is a right trapezoid, there is no need to provide an additional substrate structure on the binding adhesive layer 40, and those skilled in the art can selectively provide the second substrate layer 52 on the binding adhesive layer 40 as required.

In an embodiment, the transparent projection screen 100 further includes a first antireflection layer 61. The first antireflection layer 61 is disposed at a side of the first substrate layer 51 facing away from the prism surface 11, visible light reflectance of the first antireflection layer 61 is smaller than 0.6%, and visible light transmittance of the first antireflection layer 61 is greater than 98%. The first antireflection layer 61 is disposed at an outer side of the first substrate layer 51, which can reduce reflected light, improve the transparency of the transparent projection screen 100, and improve the clarity of a projected picture.

In an embodiment, the transparent projection screen 100 further includes a second antireflection layer 62. The second antireflection layer 62 is bonded to a side of the second substrate layer 52 facing away from the binding adhesive surface 40, visible light reflectance of the second antireflection layer 62 is smaller than 0.6%, and visible light transmittance of the second antireflection layer 62 is greater than 98%. The second antireflection layer 62 is disposed at an outer side of the second substrate layer 52, which can reduce reflected light, improve the transparency of the transparent projection screen 100, and improve the clarity of a projected picture.

In an example, the first antireflection layer 61 and the second antireflection layer 62 may be multi-layer dielectric plating films, which can bring a better antireflection effect in a wider spectrum.

Figure 4:
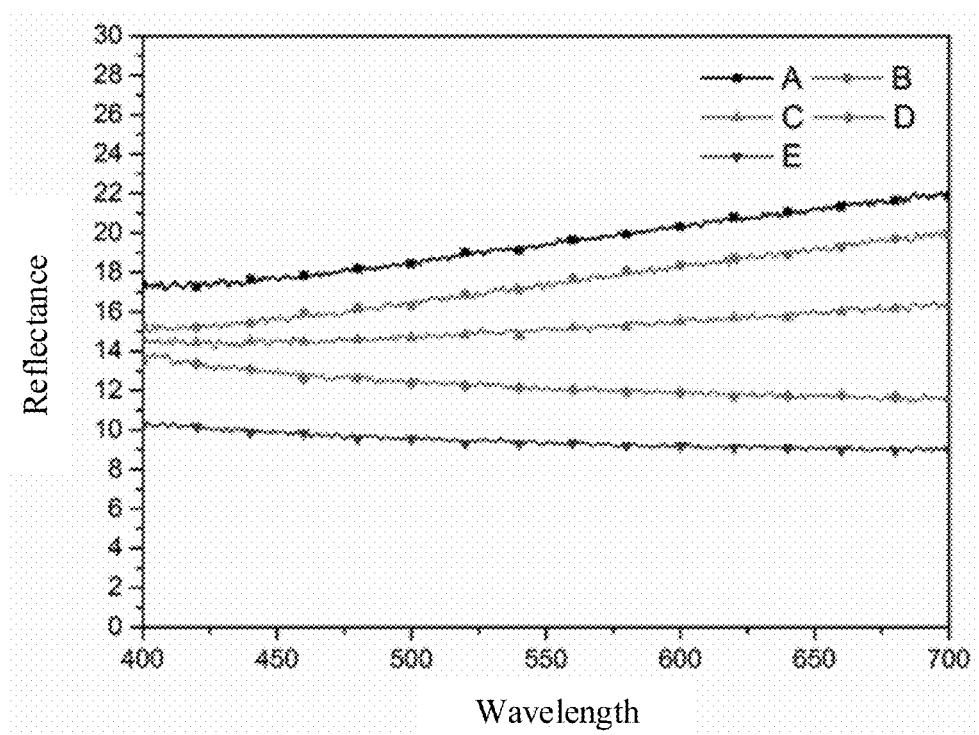
FIG. 4 shows a thickness and a visible light reflectance spectrum of a nano aluminum plating layer in the transparent projection screen according to an embodiment of the present disclosure.
Figure 5:
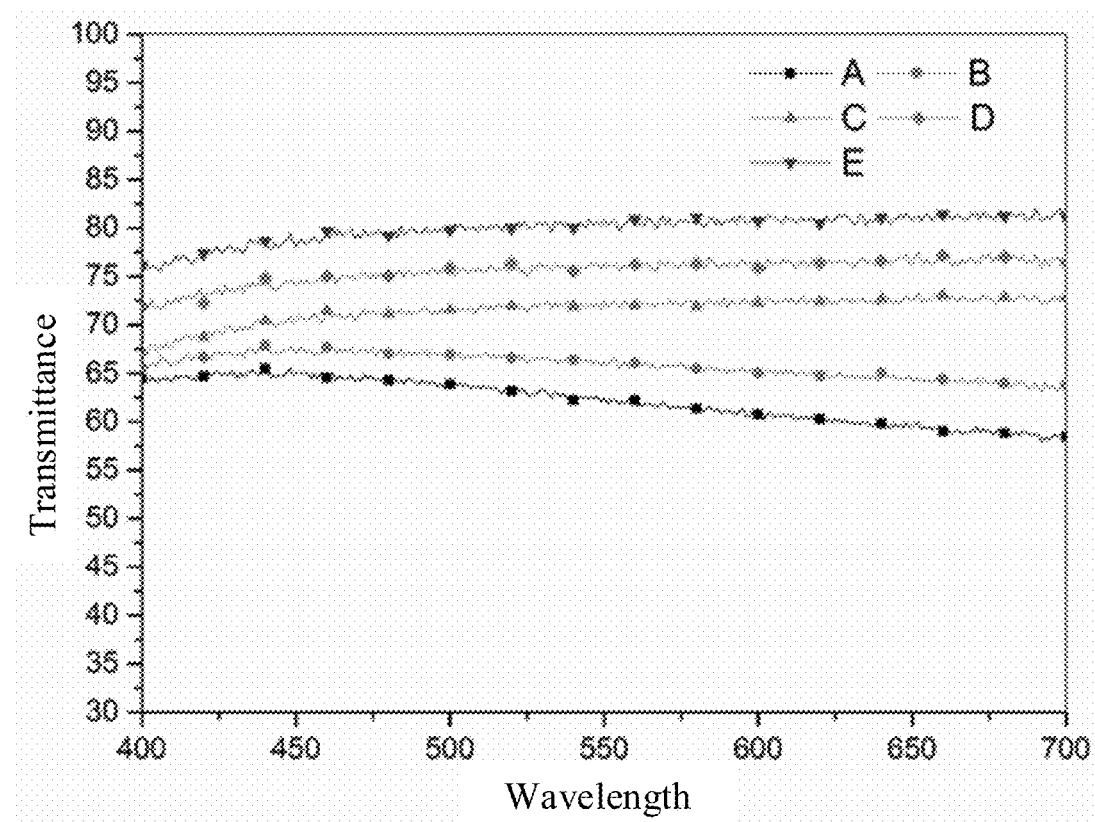
FIG. 5 shows a thickness and a visible light transmittance spectrum of a nano aluminum plating layer in the transparent projection screen according to an embodiment of the present disclosure.

Referring to FIG. 4, FIG. 5, and Table 1, in an embodiment, the nano metal plating layer 30 is a nano aluminum plating layer. As can be seen from the figures, in a certain range, as the thickness of the nano aluminum plating layer increases, the visible light reflectance by the nano aluminum plating layer increases gradually, and the transmittance to the visible light decreases gradually. Therefore, visible light reflectance and visible light transmittance of the nano aluminum plating layer can be finally controlled to meet parameter requirements by controlling the thickness of the nano aluminum plating layer.

TABLE 1

Relationship between the thickness and visible light reflectance and transmittance of the nano aluminum plating layer

| | Serial number | | | | |
| --- | --- | --- | --- | --- | --- |
| | A | B | C | D | E |
| Aluminum layer thickness (nm) | 20 | 18 | 16 | 14 | 12 |
| Visible light average reflectance (%) | 20 | 17.5 | 15 | 13 | 10.5 |
| Visible light average transmittance (%) | 62 | 66 | 71 | 76 | 80 |

In an embodiment, the nano aluminum plating layer has a thickness ranging from 12 nm to 20 nm, visible light reflectance of the nano aluminum plating layer ranges from 10% to 20%, and visible light transmittance of the nano aluminum plating layer ranges from 60% to 80%. The nano metal plating layer with the above configuration ensures good transparency of the screen while ensuring the clarity of transparent projection screen 100, which can meet the parameter requirements of the transparent projection screen 100.

In some other embodiments, the nano metal plating layer 30 may be made by some other metal materials such as silver metal or aluminum-silver metal compositions. The light can also be reflected and transmitted by controlling the thickness of the plating layer.

Figure 6:
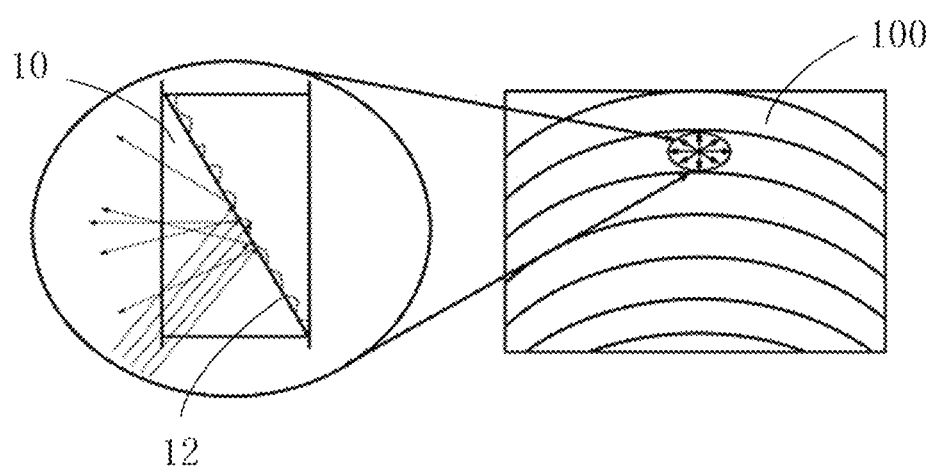
FIG. 6 is an optical path diagram of scattering of a surface diffusion layer in the transparent projection screen according to an embodiment of the present disclosure.

Referring to FIG. 6, in an embodiment, the surface diffusion layer 20 is configured to form a light scattering structure at the prism surface 11. The projection light 200 can be diffused at a wider direction range when reaching the surface diffusion layer 20, so as to increase a visualization range of the projected image, that is, increase a field of view of the transparent projection screen.

Figure 7:
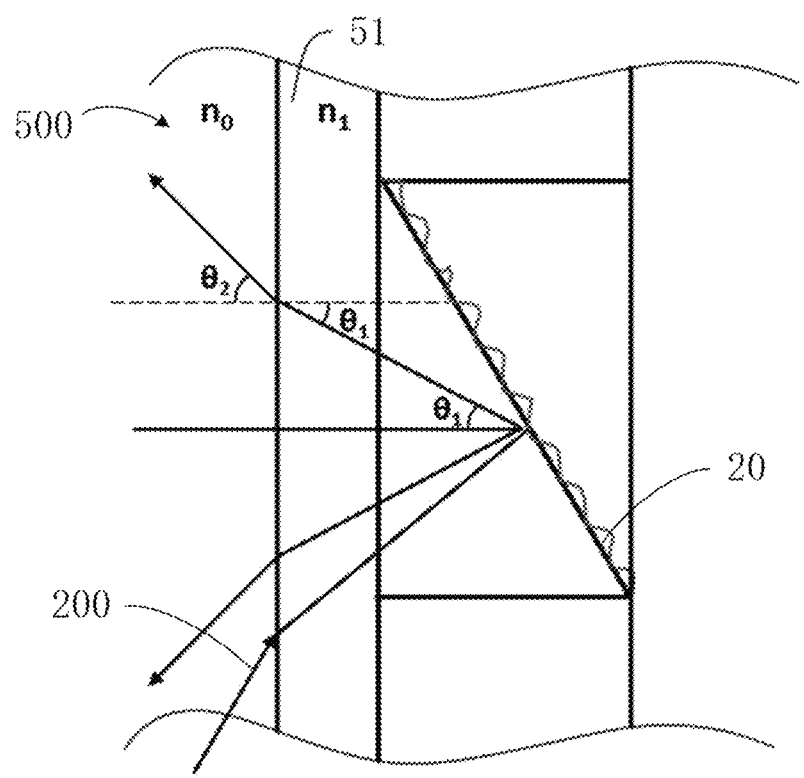
FIG. 7 is an optical path diagram of the transparent projection screen according to an embodiment of the present disclosure.

Referring to FIG. 7, in an embodiment, a scattering angle of the surface diffusion layer 20 is controlled to be within a range from 10° to 40°. If the scattering angle is too small (e.g., smaller than 10°), the field of view of the screen is too small; and if the scattering angle is too large (e.g., greater than 40°), total reflection may occur, so that part of the projection light 200 cannot be reflected back, thereby affecting light efficiency.

A specific calculation process of the scattering angle of the surface diffusion layer 20 is as follows. The refractive index of the first substrate layer 51 is defined as $n_1$, and a refractive index of an air layer 500 is defined as $n_2$. If the refractive index $n_1$ of the first substrate layer 51 ranges from 1.5 to 1.6 and the refractive index $n_2$ of the air layer 500 is 1, then, when the reflected light of the projection light 200 returns from the first substrate layer 51 to the air layer 500, since their refractive indexes are different and the refractive index $n_1$ of the first substrate layer 51 is greater than the refractive index $n_2$ of the air layer 500, it can be obtained, by calculation according to the refraction law $n_1 \sin \theta_1 = n_2 \sin \theta_2$, that $\theta_1$ is about 40° in a case of total reflection ($\theta_2 = 90°$).

In an embodiment, the surface diffusion layer 20 includes a resin film and transparent scattered particles distributed in the resin film. These transparent scattered particles can scatter the projection light to realize a scattering function of the surface diffusion layer 20. The surface diffusion layer 20 may be cured by coating the prism surface 11 with a mixture of the resin film and the transparent scattered particles. Since the process of coating the surface diffusion layer 20 is simple and easy to operate, the manufacturing process for the transparent projection screen 100 is simple and manufacturing costs thereof can be reduced.

The resin film has a thickness that may range from 1 μm to 10 μm. The resin film may be made by any transparent resin such as polycarbonate or polypropylene, provided that the refractive index of the resin film is controlled to be within a range from 1.5 to 1.6. The transparent scattered particles have a particle size that may range from 1 μm to 5 μm. The transparent scattered particles may be one or more of $SiO_2$ particles and PMMA particles, which can achieve better refractive index matching.

It may be understood that the scattering angle of the surface diffusion layer 20 may be easily controlled by changing the particle size of the transparent scattered particles, a mixing ratio of the transparent scattered particles to the resin film, and a curing temperature, so that the scattering angle of the surface diffusion layer 20 can be within a range from 10° to 40°, so as to meet functional requirements of the transparent projection screen 100.

In an embodiment, the refractive indexes of the Fresnel structure layer 10 and the binding adhesive layer 40 may be 1.5, so that the refractive index of the surface diffusion layer 20 is basically the same as that of the Fresnel structure layer 10 and the binding adhesive layer 40, so as to reduce an influence on the propagation direction and phase of the ambient light 300 therethrough, thereby further improving the transparency of the transparent projection screen 100.

In another embodiment, the surface diffusion layer 20 includes a light scattering structure having concave and convex. The light scattering structure is provided at the prism surface 11 and integrally formed with the Fresnel structure layer 10. The light scattering structure may be directly formed at the prism surface 11 by physical grinding or chemical etching, so there is no need to provide the scattering structure separately, thereby reducing manufacturing costs. Moreover, the integrated structure greatly improves structural stability between the Fresnel structure layer 10 and the surface diffusion layer 20.

In addition, the integrally formed light scattering structure is made by a same material as the Fresnel structure layer 10, which can ensure that the Fresnel structure layer 10, the surface diffusion layer 20, and the binding adhesive layer 40 have a same refractive index, thereby further improving the transparency of the transparent projection screen 100.

It can be understood that, by changing the concave and convex degree of the light scattering structure, such as a height of the convex or a depth of the concave, the scattering angle of the surface diffusion layer 20 can be controlled to be within a range from 10° to 40°, so as to meet the functional requirements of the transparent projection screen 100.

Referring to FIG. 1 again, when the transparent projection screen 100 is in operation, the projection light 200 sequentially passes through the first antireflection layer 61 and the first substrate layer 52, is incident on the prism surface 11 and reflected by the prism surface 11, and then is provided to be within the viewer's field of view; and the ambient light 300 sequentially passes through the second antireflection layer 62, the second substrate layer 52, the binding adhesive layer 40, the nano metal plating layer 30, the surface diffusion layer 20, the Fresnel structure layer 10, the first substrate layer 51, and the first antireflection layer 61, and is then outputted. According to the embodiments of the present disclosure, an overall visible light transmittance of the transparent projection screen 100 may finally be greater than 50%, which ensures good transparency of the transparent projection screen 100.

Figure 8:
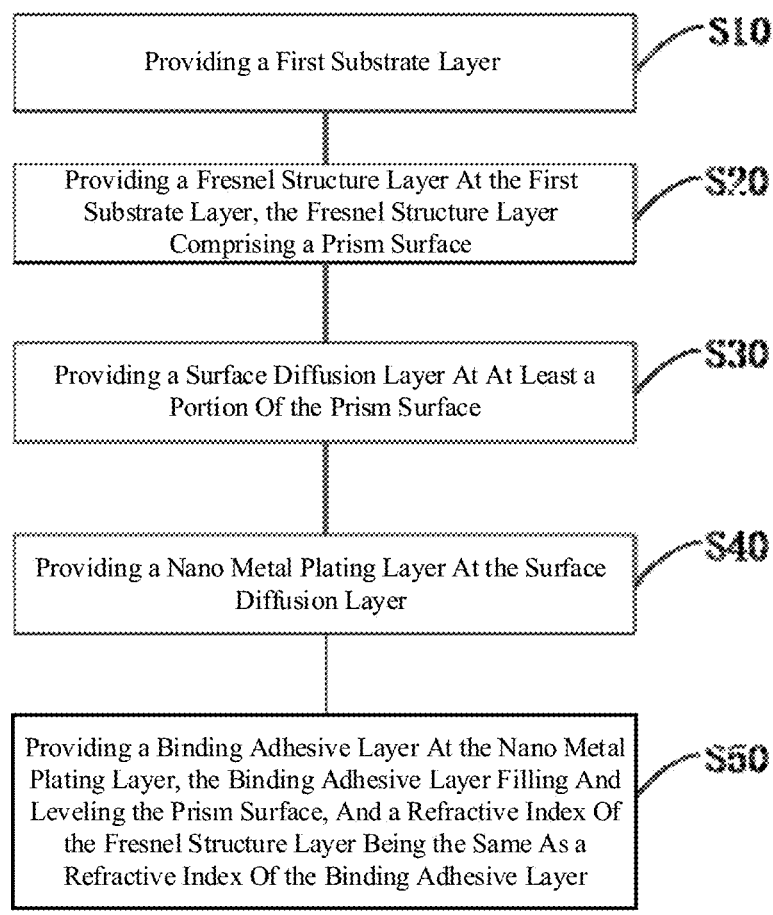
FIG. 8 is a flowchart of a manufacturing method for a transparent projection screen according to an embodiment of the present disclosure.

Referring to FIG. 1 and FIG. 8, an embodiment of the present disclosure further provides a manufacturing method for a transparent projection screen. The manufacturing method may include the following steps.

In step S10, a first substrate layer 51 is provided.

In step S20, a Fresnel structure layer 10 is provided at the first substrate layer 51, and the Fresnel structure layer 10 includes a prism surface 11.

In some embodiments, the Fresnel structure layer 10 may be formed with the following method. The Fresnel structure layer 10 is formed on the first substrate layer 51 by hot pressing or UV structural adhesive transfer. A thickness of the first substrate layer 51 can be selected according to actual requirements. In an example, the thickness of the first substrate layer 51 may be within a range from 50 μm to 200 μm.

In step S30, a surface diffusion layer 20 is provided at at least a portion of the prism surface 11.

In some embodiments, the step in which a surface diffusion layer 20 is provided at at least a portion of the prism surface 11 includes step S311 and step S312.

In step S311, a mixture of a resin film and transparent scattered particles is prepared.

In step S312, at least a portion of the prism surface 11 is coated with the mixture by spray coating or roller coating to form the surface diffusion layer 20.

In some embodiments, the step in which a surface diffusion layer 20 is provided at at least a portion of the prism surface 11 includes step S321.

In step S321, at least a portion of the prism surface 11 is formed with concave and convex by physical grinding or chemical etching to form the surface diffusion layer 20.

In step S40, a nano metal plating layer 30 is provided at the surface diffusion layer 20.

In some embodiments, the nano metal plating layer 30 may be a nano aluminum plating layer. The nano aluminum plating layer may be plated on the surface diffusion layer 20 by sputter coating. A thickness of the nano aluminum plating layer may be within a range from 12 nm to 20 nm. A specific value may be selected according to parameter requirements of a product.

In step S50, a binding adhesive layer 40 is provided at the nano metal plating layer 30, and the binding adhesive layer 40 fills and levels the prism surface 11. The binding adhesive layer 40 may be made by directly coating the nano metal plating layer 30 with binding adhesive.

In some embodiments, the manufacturing method for the transparent projection screen may further include step S60.

In step S60, a second substrate layer 52 is provided at a side of the binding adhesive layer 40 facing away from the Fresnel structure layer 10. The binding adhesive layer 40 provides an adhesive force to bind the second substrate layer 52 directly to the binding adhesive layer 40.

In some embodiments, the manufacturing method for the transparent projection screen may further include step S71 to step S72.

In step S71, a first antireflection layer 61 is provided at a side of the first substrate layer 51 facing away from the prism surface 11.

In some embodiments, the first antireflection layer 61 may be a multi-layer dielectric plating film. The multi-layer dielectric plating film may be plated on the first substrate layer 51 by sputter coating to form the first antireflection layer 61.

In step S72, a second antireflection layer 62 is provided at a side of the second substrate layer 52 facing away from the binding adhesive layer 40.

In some embodiments, the second antireflection layer 62 may be a multi-layer dielectric plating film. The multi-layer dielectric plating film may be plated on the second substrate layer 52 by sputter coating to form the second antireflection layer 62.

The transparent projection screen 100 obtained with the above manufacturing method has a stable structure, and is easy to operate and has a low cost.

Based on the above, according to the transparent projection screen 100 and the manufacturing method for same, the surface diffusion layer 20 and the nano metal plating layer 30 are sequentially provided at the prism surface 11, so that the prism surface 11 has great light scattering capability, which can improve a viewing angle of the screen and ensure clarity of a projected image while realizing ultra-short-throw projection. At the same time, the binding adhesive layer 40 having a same refractive index as the Fresnel structure layer 10 fills and levels the prism surface 11, which can reduce an influence on the propagation direction and phase of the ambient light 300 therethrough, so that most of the ambient light 300 can reach the observer's eyes through the screen, improving the transparency of the transparent projection screen 100. In addition, the transparent projection screen 100 has a simple structure, requires no separate power supply, and is easy to use.

The above embodiments only describe several implementations of the present disclosure, which are described specifically and in detail, and therefore cannot be construed as a limitation on the patent scope of the present disclosure. It should be noted that those of ordinary skill in the art may also make several changes and improvements without departing from the concept of the present disclosure, all of which shall fall within a protection scope of the present disclosure. Therefore, the scope of the present disclosure shall be subject to the appended claims.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A transparent projection screen configured to receive projection light and transmit ambient light, comprising:
a first substrate layer and a Fresnel structure layer provided at the first substrate layer, the Fresnel structure layer comprising a prism surface facing away from the first substrate;
a surface diffusion layer provided on a side of at least a portion of the prism surface facing away from the first substrate;
a nano metal plating layer provided on a side of the surface diffusion layer facing away from the first substrate, and configured to reflect the projection light and transmit the ambient light at the same time; and
a binding adhesive layer provided at the nano metal plating layer,
wherein the binding adhesive layer fills and levels the prism surface; a refractive index of the Fresnel structure layer is the same as a refractive index of the binding adhesive layer; the projection light passes through the first substrate layer and is incident on the prism surface and then reflected by the prism surface; and the ambient light sequentially passes through the binding adhesive layer, the nano metal plating layer, the surface diffusion layer, and the first substrate layer, and then is outputted,
wherein visible light transmittance of the first substrate layer is greater than 90%,
wherein the transparent projection screen further comprises a first antireflection layer provided at a side of the first substrate layer facing away from the prism surface, wherein visible light reflectance of the first antireflection layer is smaller than 0.6%, and visible light transmittance of the first antireflection layer is greater than 98%,
wherein the transparent projection screen further comprises a second substrate layer provided at a side of the binding adhesive layer facing away from the Fresnel structure layer, wherein visible light transmittance of the second substrate layer is greater than 90%,
wherein the transparent projection screen further comprises a second antireflection layer bonded to a side of the second substrate layer facing away from the binding adhesive surface, wherein visible light reflectance of the second antireflection layer is smaller than 0.6%, and visible light transmittance of the second antireflection layer is greater than 98%.

2. The transparent projection screen of claim 1, wherein the nano metal plating layer is a nano aluminum plating layer.

3. The transparent projection screen of claim 2, wherein the nano aluminum plating layer has a thickness within a range from 12 nm to 20 nm, visible light reflectance of the nano aluminum plating layer is within a range from 10% to 20%, and visible light transmittance of the nano aluminum plating layer is within a range from 60% to 80%.

4. The transparent projection screen of claim 1, wherein the surface diffusion layer has a scattering angle within a range from 10° to 40°.

5. The transparent projection screen of claim 1, wherein the surface diffusion layer comprises a resin film and transparent scattered particles distributed in the resin film.

6. The transparent projection screen of claim 5, wherein the resin film has a thickness within a range from 1 μm to 10 μm, the resin film has a refractive index within a range from 1.5 to 1.6, and the transparent scattered particles have a particle size within a range from 1 μm to 5 μm.

7. The transparent projection screen of claim 1, wherein the surface diffusion layer comprises a light scattering structure having convex and concave, the light scattering structure is provided at the prism surface and the light scattering structure is integrally formed with the Fresnel structure layer.

8. The transparent projection screen of claim 1, wherein the refractive index of the Fresnel structure layer is 1.5, and the refractive index of the binding adhesive layer is 1.5.

9. A manufacturing method for a transparent projection screen, comprising:
   providing a first substrate layer;
   providing a Fresnel structure layer at the first substrate layer, the Fresnel structure layer comprising a prism surface facing away from the first substrate;
   providing a surface diffusion layer on a side of at least a portion of the prism surface facing away from the first substrate;
   providing a nano metal plating layer on a side of the surface diffusion layer facing away from the first substrate, and configured to reflect projection light and transmit ambient light at the same time; and
   providing a binding adhesive layer at the nano metal plating layer, the binding adhesive layer filling and leveling the prism surface, and a refractive index of the Fresnel structure layer being the same as a refractive index of the binding adhesive layer,
   wherein visible light transmittance of the first substrate layer is greater than 90%,
   wherein the transparent projection screen further comprises a first antireflection layer provided at a side of the first substrate layer facing away from the prism surface, wherein visible light reflectance of the first antireflection layer is smaller than 0.6%, and visible light transmittance of the first antireflection layer is greater than 98%,
   wherein the transparent projection screen further comprises a second substrate layer provided at a side of the binding adhesive layer facing away from the Fresnel structure layer, wherein visible light transmittance of the second substrate layer is greater than 90%,
   wherein the transparent projection screen further comprises a second antireflection layer bonded to a side of the second substrate layer facing away from the binding adhesive surface, wherein visible light reflectance of the second antireflection layer is smaller than 0.6%, and visible light transmittance of the second antireflection layer is greater than 98%.

10. The manufacturing method of claim 9, wherein said providing a surface diffusion layer on a side of at least a portion of the prism surface facing away from the first substrate comprises:
   preparing a mixture of a resin film and transparent scattered particles; and
   coating at least a portion of the prism surface with the mixture by spray coating or roller coating to form the surface diffusion layer.

11. The manufacturing method of claim 9, wherein said providing a surface diffusion layer on a side of at least a portion of the prism surface facing away from the first substrate comprises:
   forming at least a portion of the prism surface with concave and convex by physical grinding or chemical etching to form the surface diffusion layer.

* * * * *